(12) United States Patent
Sekiba

(10) Patent No.: US 7,999,033 B2
(45) Date of Patent: *Aug. 16, 2011

(54) THERMOCONDUCTIVE SILICONE ELASTOMER, THERMOCONDUCTIVE SILICONE ELASTOMER COMPOSITION AND THERMOCONDUCTIVE MEDIUM

(75) Inventor: Kazuhiro Sekiba, Chigasaki (JP)

(73) Assignee: Dow Corning Toray Company, Ltd., Chiyoda-Ku, Tokyo (JP)

( * ) Notice: Subject to any disclaimer, the term of this patent is extended or adjusted under 35 U.S.C. 154(b) by 280 days.

This patent is subject to a terminal disclaimer.

(21) Appl. No.: 12/088,586

(22) PCT Filed: Sep. 29, 2005

(86) PCT No.: PCT/JP2005/018482
§ 371 (c)(1),
(2), (4) Date: Apr. 8, 2009

(87) PCT Pub. No.: WO2007/037019
PCT Pub. Date: Apr. 5, 2007

(65) Prior Publication Data
US 2009/0191414 A1    Jul. 30, 2009

(51) Int. Cl.
*C08L 83/04* (2006.01)

(52) U.S. Cl. ........ 524/588; 524/430; 524/441; 524/492; 524/268; 525/477; 525/478; 525/479; 528/15; 528/31; 528/32

(58) Field of Classification Search .................... None
See application file for complete search history.

(56) References Cited

U.S. PATENT DOCUMENTS

| 4,444,944 A * | 4/1984 | Matsushita | 524/786 |
| 4,604,424 A * | 8/1986 | Cole et al. | 524/862 |
| 5,008,307 A * | 4/1991 | Inomata | 523/220 |
| 5,801,332 A * | 9/1998 | Berger et al. | 174/73.1 |
| 6,069,201 A | 5/2000 | Okinoshima et al. | |
| 7,013,965 B2 * | 3/2006 | Zhong et al. | 165/185 |
| 2005/0148721 A1 * | 7/2005 | Tonapi et al. | 524/492 |
| 2009/0275688 A1 * | 11/2009 | Sekiba | 524/430 |

FOREIGN PATENT DOCUMENTS

| EP | 1340791 A1 | 9/2003 |
| JP | 56002349 A | 1/1981 |
| JP | 2001-011402 A | 1/2001 |
| WO | WO 2006025552 A1 | 3/2006 |

OTHER PUBLICATIONS

ASTM Standard Test Method for Rubber Properties in Tension (no date).*
JIS K 6251 Standard Test Method for Determination of Tensile Stress-strain Properties in Rubber (no date).*
Information on the goal of test method JIS K 6250 as described at http://www.rubbercenter.org/standard/standard.php?page=4 &stand=JIS.*
English language abstract for JP 56002349 extracted from espacenet.com database, dated Nov. 11, 2008.
English language translation and abstract for JP 2001-011402 extracted from PAJ database, dated Nov. 11, 2008, 49 pages.
PCT International Search Report for PCT/JP2005/018482, dated Jun. 2, 2006, 3 pages.
PCT International Search Report for PCT/JP2005/016170, Dated Jun. 12, 2005, 3 pages.

* cited by examiner

*Primary Examiner* — Marc S Zimmer
(74) *Attorney, Agent, or Firm* — Howard & Howard Attorneys PLLC

(57) ABSTRACT

A thermoconductive silicone elastomer comprising a silicone elastomer being a cured body of a hydrosilation-curable organopolysiloxane composition, a reinforcing fine powder silica, a thermoconductive inorganic powder, and a non-reactive organopolysiloxane that is liquid at room temperature which are dispersed in the aforementioned silicone elastomer; a thermoconductive medium comprising the aforementioned thermoconductive silicone elastomer; a hydrosilation-curable thermoconductive silicone elastomer composition comprising a hydrosilation-curable organopolysiloxane composition, a reinforcing fine powder silica, a thermoconductive inorganic powder, and a non-reactive organopolysiloxane that is liquid at room temperature.

22 Claims, 1 Drawing Sheet

THERMOCONDUCTIVE SILICONE ELASTOMER, THERMOCONDUCTIVE SILICONE ELASTOMER COMPOSITION AND THERMOCONDUCTIVE MEDIUM

RELATED APPLICATIONS

This application claims priority to and all the advantages of International Patent Application No. PCT/JP2005/018482, filed on Sep. 29, 2005.

TECHNICAL FIELD

The present invention relates to a thermoconductive silicone elastomer that demonstrates adherence to a heat-generating member and a heat-radiating member or heat-dissipating member, as well as the property of peeling by stretching from a heat-generating member and a heat-radiating member or heat-dissipating member between which this elastomer is sandwiched, and to a thermoconductive medium comprising the aforementioned thermoconductive silicone elastomer. The present invention also relates to a hydrosilation-curable thermoconductive silicone elastomer composition that comprises a hydrosilation-curable organopolysiloxane composition, reinforcing fine powder silica, a thermoconductive inorganic powder, and a non-reactive organopolysiloxane that is liquid at room temperature.

BACKGROUND ART

In view of the present trend within the field of electronic devices towards miniaturization, increase in density of electronic elements, and improvement in performance characteristics, the methods used for transmitting and dissipating heat from heat-generating elements of such devices become an important issue.

Heretofore, it has been known to solve the above problems by placing a molded body of a thermoconductive silicone rubber containing a large amount of a thermoconductive inorganic powder, e.g., an alumina powder, between a heat-generating element and heat-radiating fins, or a similar metal chassis. Such a thermoconductive molded silicone rubber product is disclosed, e.g., in Japanese Unexamined Patent Application Publication [herein referred to as "JP Kokai"] S56-2349.

It should be noted in this connection that the aforementioned thermoconductive molded silicone rubber products have a relatively high hardness of 54 to 73 measured by a Type A durometer in accordance with JIS K 6253 and poor tackiness. Therefore, the use of such molded products in assembling operations that involve sandwiching and fixation thereof between heat-generating elements and heat-radiating fins, or a similar metal chassis presents a problem. In some cases fixation requires the use of screws or other fasteners which is inconvenient in case of repair and disassembling.

At the present time, plasma display panels find ever growing application in monitors of TV sets, computers, etc. For example, JP Kokai 2001-11402 discloses a thermoconductive adhesive agent sheet with streaky grooves placed between a plasma display and a heat-radiating plate or heat-dissipating plate. The adhesive agent used in the above example is a silicone-type adhesive. A disadvantage of the structure is that the adhesive used in this structure is permanently attached to the plasma display and the heat-radiating plate or heat-dissipating plate and the unit cannot be disassembled, e.g., in case of repair or disposing, without destroying it.

SUMMARY OF THE INVENTION

It is an object of the present invention to provide a thermoconductive silicone elastomer that demonstrates adherence to a heat-generating member and a heat-radiating member or heat-dissipating member, can be fixed between a heat-generating member and a heat-radiating member or heat-dissipating member without the use of screws or other fasteners, and, when it is necessary for repair or disassembling, can be easily peeled or released from both members by stretching. It is another object to provide a thermoconductive silicone elastomer composition for the preparation of the aforementioned silicone elastomer.

The above objects are achieved by means of the present invention that provides the following:

(1) A thermoconductive silicone elastomer, the total 100 wt. % of which comprises: 90 to 10 wt. % of a silicone elastomer being a cured body of a hydrosilation-curable organopolysiloxane composition consisting of (A) an organopolysiloxane having at least two alkenyl groups in one molecule, (B) an organohydrogenpolysiloxane having at least two silicon-bonded hydrogen atoms in one molecule, and (C) a platinum-type catalyst; and the following components dispersed in said elastomer: (D) 0.2 to 5.0 wt. % of a reinforcing fine powder silica; (E) 10 to 90 wt. % of a thermoconductive inorganic powder; and (F) 0 to 10 wt. % of a non-reactive organopolysiloxane that is liquid at room temperature (wherein, when said component (A) is an alkylalkenylpolysiloxane that has at least two alkenyl groups in one molecule, said component (B) is an alkylhydrogenpolysiloxane that has at least two silicon-bonded hydrogen atoms in one molecule, and said component (F) is an alkylphenylpolysiloxane that is liquid at room temperature, the content of said component (F) is 0 to less than 0.1 wt. %), wherein a thermoconductive silicone elastomer prepared by curing said composition has a hardness of 5 to 70 measured by a spring-type hardness tester according to SRIS 0101-1968, a tensile strength above 0.2 MPa according to JIS K 6250, an elongation exceeding 300%, the thermoconductive silicone elastomer demonstrates adherence to a heat-generating member and a heat-radiating member or heat-dissipating member, and the thermoconductive silicone elastomer can be peeled by stretching from a heat-generating member and a heat-radiating member or heat-dissipating member between which said thermoconductive silicone elastomer is sandwiched.

(2) The thermoconductive silicone elastomer of Item (1), wherein said component (A) is a methylvinylpolysiloxane of the following formula:

$$R^1{}_3SiO(R_2SiO)_m SiR^2{}_3$$

(where R, $R^1$ and $R^2$ are methyl or vinyl groups; at least two vinyl groups exist in one molecule; and when all R's in one molecule are methyl groups, at least one of $R^1$ and at least one of $R^2$ are vinyl groups; when one R in one molecule is a methyl group, at least one of $R^1$ and $R^2$ is a vinyl group; 0.1 to 2% of the total content of both methyl groups and vinyl groups are vinyl groups; and "m" is a number between 50 and 1000); said alkylhydrogenpolysiloxane is a methylhydrogenpolysiloxane; said component (D) is a fumed silica; said component (E) is an alumina powder or a crystalline silica powder; said non-reactive organopolysiloxane is a methylalkylpolysiloxane or a methyl(perfluoroalkyl)polysiloxane.

(3) The thermoconductive silicone elastomer according to Item (1) or Item (2), wherein said thermoconductive silicone elastomer is produced by curing a precursor composition thereof when the latter is sandwiched between a heat-generating member and a heat-radiating member or heat-dissipating member.

(4) A thermoconductive hydrosilation-curable silicone elastomer composition, the total 100 wt. % of which comprises: 90 to 10 wt. % of a hydrosilation-curable organopolysiloxane composition consisting of (A) an organopolysiloxane having at least two alkenyl groups in one molecule, (B) an organohydrogenpolysiloxane having at least two silicon-bonded hydrogen atoms in one molecule, and (C) a platinum-type catalyst; (D) 0.2 to 5.0 wt. % of a reinforcing fine powder silica; (E) 10 to 90 wt. % of a thermoconductive inorganic powder; and (F) 0 to 10 wt. % of a non-reactive organopolysiloxane that is liquid at room temperature (wherein when said component (A) is an alkylalkenylpolysiloxane that has at least two alkenyl groups in one molecule, said component (B) is an alkylhydrogenpolysiloxane that has at least two silicon-bonded hydrogen atoms in one molecule, and said component (F) is an alkylphenylpolysiloxane that is liquid at room temperature, the content of said component (F) is 0 to less than 0.1 wt. %), wherein a thermoconductive silicone elastomer prepared by curing said composition has a hardness of 5 to 70 measured by a spring-type hardness tester according to SRIS 0101-1968, a tensile strength above 0.2 MPa according to JIS K 6250, an elongation exceeding 300%, the thermoconductive silicone elastomer demonstrates adherence to a heat-generating member and a heat-radiating member or heat-dissipating member, and can be peeled by stretching from a heat-generating member and a heat-radiating member or heat-dissipating member between which said thermoconductive silicone elastomer is sandwiched.

(5) The thermoconductive silicone elastomer composition of Item (4), wherein said component (A) is a methylvinylpolysiloxane of the following formula:

$R^1{}_3SiO(R_2SiO)_m SiR^2{}_3$ (where R, $R^1$ and $R^2$ are methyl or vinyl groups; at least two vinyl groups exist in one molecule; and when all R's in one molecule are methyl groups, at least one of $R^1$ and at least one of $R^2$ are vinyl groups; when one R in one molecule is a methyl group, at least one of $R^1$ and $R^2$ is a vinyl group; 0.1 to 2% of the total content of both methyl groups and vinyl groups are vinyl groups; and "m" is a number between 50 and 1000); said alkylhydrogenpolysiloxane is a methylhydrogenpolysiloxane; said component (D) is a fumed silica; said component (E) is an alumina powder or a crystalline silica powder; said non-reactive organopolysiloxane is a methylalkylpolysiloxane or a methyl(perfluoroalkyl)polysiloxane.

(6) The thermoconductive silicone elastomer composition according to Item (4) or Item (5), wherein said thermoconductive silicone elastomer is produced by curing a precursor composition thereof when the latter is sandwiched between a heat-generating member and a heat-radiating member or heat-dissipating member.

(7) A thermoconductive medium comprising the thermoconductive silicone elastomer according to one of Items (1) to (3).

Since the thermoconductive silicone elastomer of the present invention demonstrates adherence to a heat-generating member and a heat-radiating member or heat-dissipating member, can be fixed between such members without the use of screws or other fasteners, and can be easily peeled or pulled out from them by stretching, the use of this elastomer will facilitate repair and disassembly of units that incorporate such an elastomer. When the hydrosilation-curable thermoconductive elastomer composition of the present invention is cured, it is turned into a thermoconductive silicone elastomer that can be fixed between a heat-generating member and a heat-radiating member or heat-dissipating member without the use of screws or other fasteners, and can be easily peeled or pulled out from them by stretching. Therefore, the use of this composition will facilitate repair and disassembly of units that incorporate the elastomer made from this composition. More specifically, the thermoconductive silicone elastomer can be easily disconnected from the heat-generating member and the heat-radiating member or heat-dissipating member by pulling it out from the connection between these members.

Figure 1:
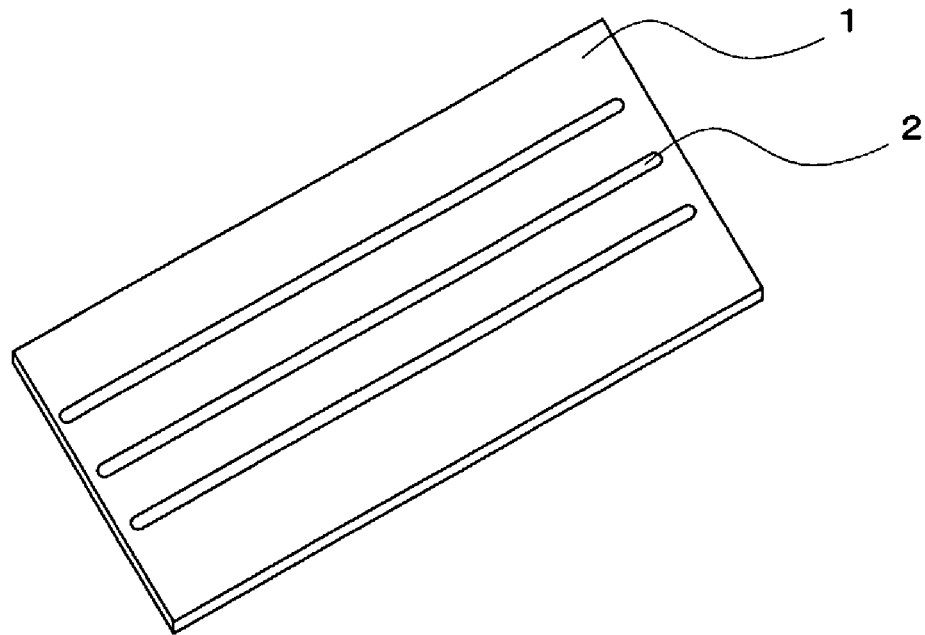
FIG. 1 is a three-dimensional view of an aluminum plate (A1050P) coated with the thermoconductive silicone elastomer composition.

1—aluminum (A1050P) plate
2—thermoconductive silicone elastomer composition
3—thermoconductive silicone elastomer
4—float glass plate

BEST MODE FOR CARRYING OUT THE INVENTION

Component (A) of the thermoconductive silicone elastomer of the present invention and of its composition is an alkylalkenylpolysiloxane with at least two alkenyl groups in one molecule. This component cross-links and cures as a result of a hydrosilation reaction of its alkenyl groups with silicon-bonded hydrogen atoms of component (B). Preferably, this component should have a linear molecular structure, and, to some extent, a branched molecular structure. It may comprise a homopolymer, a copolymer, or a mixture of two or more polymers.

Silicon-bonded organic groups other than silicon-bonded alkenyl groups of component (A) may comprise univalent hydrocarbon groups that are free of aliphatic unsaturated bonds in their molecules. Examples of such groups are the following: methyl, ethyl, propyl, butyl, octyl, cyclopentyl, cyclohexyl, or similar alkyl groups; phenyl, tolyl, xylyl, or similar aryl groups; benzyl, phenylethyl, or similar aralkyl groups; 3,3,3-trifluoropropyl, or similar halogenated alkyl groups. It is preferable, however, that methyl groups constitute 50 mole % or more. The alkenyl groups may be exemplified by vinyl groups, allyl groups, butenyl groups, pentenyl groups, hexenyl groups, and heptenyl groups. Molecular terminal groups may comprise methoxy, ethoxy, or similar alkoxy groups, as well as hydroxyl groups. It is preferable that 90 mole %, and even 100 mole % of the aforementioned univalent hydrocarbon groups comprise methyl groups. From the point of view of desired hardness and elongation properties of the silicone elastomer, it is recommended that in one molecule silicon-bonded alkenyl groups constitute 0.1 to 2% of the sum of alkenyl groups and univalent hydrocarbon groups that are free of aliphatic unsaturated bonds.

From the point of view of ease of manufacture and desired hardness and elongation properties, it is recommended that component (A) comprise a methylvinylpolysiloxane of the following formula:

$R^1{}_3SiO(R_2SiO)_m SiR^2{}_3$ (where R, $R^1$ and $R^2$ are methyl or vinyl groups; at least two vinyl groups exist in one molecule; and when all R's in one molecule are methyl groups, at least one of W and at least one of $R^2$ are vinyl groups; when one R in one molecule is a methyl group, at least one of $R^1$ and $R^2$ is a vinyl group; 0.1 to 2% of the total content of both methyl groups and vinyl groups are vinyl groups; and "m" is a number between 50 and 1000).

There are no special restrictions with regard to viscosity of component (A), provided that it is liquid at 25° C. It is recommended, however, from the point of view of improved physical properties of a cured product and improved conditions for curing of the composition, that this component has a viscosity within the range of 50 to 1,000,000 mPa·s, preferably 200 to 500,000 mPa·s, and even more preferably, 1,000 to 100,000 mPa·s.

The aforementioned component (A) may be exemplified by a dimethylpolysiloxane capped at both molecular terminals with dimethylvinylsiloxy groups, a dimethylsiloxane.methylvinylsiloxane copolymer capped at both molecular terminals with trimethylsiloxy groups, a dimethylsiloxane.methylvinylsiloxane copolymer capped at both molecular terminals with dimethylvinylsiloxy groups, and a dimethylsiloxane.methylvinylsiloxane copolymer capped at both molecular terminals with dimethylethoxysiloxy groups. From the point of view of desired hardness and elongation properties of the elastomer, it is recommended to use a dimethylpolysiloxane capped at both molecular terminals with dimethylvinylsiloxy groups (the vinyl groups of one molecule should constitute 0.1 to 2% of the sum of methyl and vinyl groups), a dimethylsiloxane-methylvinylsiloxane copolymer capped at one molecular terminal with a dimethylvinylsiloxy group and at the other terminal with a trimethylsiloxy group (the vinyl groups of one molecule should constitute 0.1 to 2% of the sum of methyl and vinyl groups), and a dimethylsiloxane.methylvinylsiloxane copolymer capped at both molecular terminals with dimethylvinylsiloxy groups (the vinyl groups of one molecule should constitute 0.1 to 2% of the sum of methyl and vinyl groups).

Alkylhydrogenpolysiloxane (B) that has at least two silicon-bonded hydrogen atoms in one molecule cross-links component (A) and cures as a result of a hydrosilation reaction of its silicon-bonded hydrogen atoms with alkenyl groups of component (A).

Component (B) may be liquid at room temperature and may have a linear, branched, or cyclic molecular structure. It can be a homopolymer, copolymer, or a mixture of two or more polymers. Silicon-bonded alkyl groups may be the same as those exemplified above for component (A), of which methyl groups are preferable. When component (A) contains two alkenyl groups in one molecule, a molecule of component (B) should contain three or more silicon-bonded hydrogen atoms, and when component (A) contains three or more alkenyl groups in one molecule, component (B) should contain two or more silicon-bonded hydrogen atoms. From the point of view of such properties as hardness and elongation, it is recommended that component (B) consist of one or more units of formula $HSiO_{3/2}$, formula $R^3HSiO_{2/2}$, and formula $R^3_2HSiO_{1/2}$, and siloxane units that contain univalent hydrocarbon groups and are free of unsaturated aliphatic bonds. It is recommended that the content of aforementioned HSi-containing siloxane units be within the range of 2 to 60 mole %, preferably, 5 to 50 mole % of all siloxane units. In the above formulae, $R^3$ designates a univalent hydrocarbon group that is free of unsaturated aliphatic bonds. Examples of such groups are the following: methyl, ethyl, propyl, butyl, pentyl, hexyl, heptyl, or a similar alkyl group; phenyl, tolyl, xylyl, or a similar aryl group; benzyl, phenethyl, or a similar aralkyl group; 3-chloropropyl, 3,3,3-trifluoropropyl, or a similar halogenated alkyl group, of which alkyl, and especially methyl groups are preferable. The univalent hydrocarbon groups which are free of unsaturated aliphatic bonds and contained in the aforementioned siloxane units that contain univalent hydrocarbon groups and are free of unsaturated aliphatic bonds are the same as listed above. From the point of view of improved adhesive properties of the silicone elastomer and peelability from a heat-generating member and a heat-radiating member or heat-dissipating member, it is recommended that the mole ratio of silicon-bonded hydrogen atoms of component (B) to alkenyl groups of component (A) be within the range of 3.0 to 0.5, preferably 2.0 to 0.6, and even more preferably, 1.5 to 0.7.

The following are specific examples of component (B): dimethylsiloxane.methylhydrogensiloxane copolymer capped at both molecular terminals with trimethylsiloxy groups, dimethylpolysiloxane capped at both molecular terminals with dimethylhydrogensiloxy groups, dimethylsiloxane methylhydrogensiloxane copolymer capped at both molecular terminals with dimethylhydrogensiloxy groups, a copolymer of methylhydrogensiloxane and cyclic dimethylsiloxane, and methyl-tri(dimethylhydrogensiloxy) silane. From the viewpoint of improved properties of hardness and elongation of the silicone elastomer, it is recommended to use a dimethylsiloxane.methylhydrogensiloxane copolymer capped at both molecular terminals with trimethylsiloxy groups, dimethylsiloxane capped at both molecular terminals with dimethylhydrogensiloxy groups, and copolymer of methylhydrogensiloxane and cyclic dimethylsiloxane. If methylhydrogenpolysiloxane capped at both molecular terminals with trimethylsiloxy groups, methylhydrogenpolysiloxane capped at both molecular terminals with dimethylhydrogensiloxy groups, cyclic methylhydrogenpolysiloxane, and tetra (dimethylhydrogensiloxy) silane are added in small quantities, they can be used together with the aforementioned preferable compounds of component (B).

Platinum metal group catalyst (C) is used for accelerating the hydrosilation reaction between the alkenyl groups of component (A) and silicon-bonded hydrogen atoms of component (B). The following are specific examples of component (C): fine platinum powder, chloroplatinic acid, complex of chloroplatinic acid and β-diketone, complex of chloroplatinic acid and olefin, complex of chloroplatinic acid and divinyltetramethyldisiloxane, complex of platinum and divinyltetramethyldisiloxane, thermoconductive silicone resin powder that contains the aforementioned platinum type catalysts, rhodium compounds such as $RhCl(Ph_3P_3)$, $RhCl_3[S(C_4H_9)_2]_3$, etc.; tetrakis (triphenyl) palladium, a mixture of palladium black with triphenylphosphine or similar palladium type compounds.

Component (C) should be used in a so-called catalytic quantity sufficient for cross-linking components (A) and (B). In particular, it may be recommended to use the catalyst in such an amount that the content of the metallic platinum in this component be within the range of 0.01 to 500 parts by weight, preferably 0.1 to 100 parts by weight per 106 parts of the sum of components (A) and (B).

The silicone elastomer being a cured body of the hydrosilation-curable organopolysiloxane composition consisting of an organopolysiloxane (A) having at least two alkenyl groups in one molecule, an organohydrogenpolysiloxane (B) having at least two silicon-bonded hydrogen atoms in one molecule, and a platinum-type catalyst (C) is contained in an amount of 90 to 10 wt. %, preferably 80 to 20 wt. % in the thermoconductive silicone elastomer. The hydrosilation-curable organopolysiloxane composition consisting of an organopolysiloxane (A) having at least two alkenyl groups in one molecule, an organohydrogenpolysiloxane (B) having at least two silicon-bonded hydrogen atoms in one molecule, and a platinum-type catalyst (C) is contained in the hydrosilation-curable thermoconductive silicone elastomer composition in an amount of 90 to 10 wt. %, preferably 80 to 20 wt. %.

Reinforcing fine powder silica (D) is a component that is used for improving viscosity of the mixture of components (A) and (B), as well as for improving mechanical strength of a cured body of the silicone elastomer. This component can typically be exemplified by fumed silica which is also known as a dry-process silica and precipitated silica which is also known as precipitation-process silica. For improving viscosity of the composition, the fumed silica or precipitated silica, and especially fumed silica, can be hydrophobized by subjecting it to surface coating with an organic silicone compound (such as, e.g., trimethylchlorosilane, dimethyldichlorosilane, hexamethyldisiloxane, octamethylcyclotetrasiloxane).

In a dispersed form, component (D) should be contained in the thermoconductive silicone elastomer in an amount of 0.2 to 5.0 wt. %, and in the hydrosilation-curable thermoconductive silicone elastomer composition, in an amount of 0.2 to 5.0 wt. %, preferably 0.5 to 3 wt. %.

Thermoconductive inorganic powder (E) is a component used for imparting thermoconductivity to the silicone elastomer. This component can be represented by alumina powder, crystalline silica powder, zinc oxide powder, magnesium oxide powder, aluminum nitride powder, silicon nitride powder, boron nitride powder, and silicon carbide. The average particle size of component (E) should be within the range of 1 to 50 μm.

Typical examples of alumina powder are amorphous alumina powder and spherical alumina powder. Examples of crystalline silica are amorphous crystalline silica and spherical crystalline silica.

An amorphous alumina powder is α-alumina powder produced mainly by crushing. Spherical alumina powder has an average particle size within the range of 1 to 50 μm. Alumina powder of this type is α-alumina powder and is produced mainly by hot aerosol method or by hydrothermal treatment of alumina anhydride. In the context of the present invention, the term "spherical alumina powder" covers not only powder with geometrically correct spherical particles but also particles of a substantially spherical shape, i.e., powder having more than 90% of particles with the shape factor within the range of 1.0 to 1.4. The shape factor is determined according to JIS R 6002 as an average value of a ratio of the largest diameter to the smallest diameter of the particles measured on 200 particles under microscopic magnification. Thus, in a powder with the shape factor of 1, all particles will be completely spherical, while in a powder with the shape factor different from 1 the shape of the particles will to some extent deviate from the correct geometrical sphere.

In the thermoconductive silicone elastomer and hydrosilation-curable thermoconductive silicone elastomer composition, component (E) is contained in a dispersed form. If component (E) is contained in the hydrosilation-curable thermoconductive silicone elastomer composition in an excessive amount, the composition becomes too viscous, and if the content of component (E) is too low, it will be impossible to provide a cured body of the composition with a high coefficient of thermal conductivity. Therefore, it is recommended that the content of component (E) in the composition be within the range of 10 to 90 wt %, preferably 30 to 80 wt. %.

Component (E) can be surface-treated with an organosiloxane-type surface treatment agent or with a silane-type surface treatment agent such as methyltrimethoxysilane, vinyltrimethoxysilane, dimethyldimethoxysilane, 3-glycidoxypropyltrimethoxysilane, 3-methacryloxypropyltrimethoxysilane, and hexamethyldisilazane.

Non-reactive organopolysiloxane (F) that is liquid at room temperature is used for imparting to a thermoconductive silicone elastomer sandwiched between a heat-generating member and a heat-radiating member or heat-dissipating member the property of peeling from these members when the elastomer is pulled from their connection. In this content, the term "non-reactive" means that this component does not participate in a hydrosilation reaction or condensation reaction with bonding to the silicone elastomer.

Representatives of this non-reactive component are methylalkylpolysiloxane and methyl(perfluoroalkyl)polysiloxane. Alkyl groups of these polysiloxanes are the same as the alkyl groups of component (A). The perfluoroalkyl is typically a 3,3,3-trifluoropropyl group, but $C_4F_9CH_2CH_2-$ and $C_6F_{13}CH_2CH_2-$ are other examples. The methylalkylpolysiloxane can be exemplified by dimethylpolysiloxane having both molecular terminals capped with trimethylsiloxy groups, methylalkylpolysiloxane having both molecular terminals capped with trimethylsiloxy groups (with the number of carbon atoms in alkyl groups within the range of 2 to 20), a methylalkylpolysiloxane.dimethylsiloxane copolymer having both molecular terminals capped with trimethylsiloxy groups (with the number of carbon atoms in alkyl groups within the range of 2 to 20), dimethylpolysiloxane having both molecular terminals capped with dimethylalkylsiloxy groups (with the number of carbon atoms in alkyl groups within the range of 2 to 20), and a methylalkylsiloxane.dimethylsiloxane copolymer having both molecular terminals capped with dimethylalkylsiloxy groups (with the number of carbon atoms in alkyl groups within the range of 2 to 20). The methyl(perfluoroalkyl)polysiloxane may be represented by methyl(perfluoroalkyl)polysiloxane having both molecular terminals capped with trimethylsiloxy groups, a methyl (perfluoroalkyl)siloxane.dimethylsiloxane copolymer having both molecular terminals capped with trimethylsiloxy groups (with the number of carbon atoms in the perfluoroalkyl groups within the range of 3 to 20), dimethylpolysiloxane having both molecular terminals capped with dimethylalkylsiloxane groups (with the number of carbon atoms in the perfluoroalkyl groups within the range of 3 to 20), and a methyl(perfluoroalkyl)siloxane.dimethylsiloxane copolymer capped at both molecular terminals with dimethyl(perfluoroalkyl)siloxy groups (with the number of carbon atoms in the perfluoroalkyl groups within the range of 3 to 20). One more example is methylalkylaralkylpolysiloxane.

In a dispersed form, component (F) is contained in the thermoconductive silicone elastomer in an amount of 0.1 to 10 wt. %, preferably 1 to 6 wt. %, and in the hydrosilation-curable thermoconductive silicone elastomer composition in an amount of 0.1 to 10 wt. %, preferably 1 to 6 wt. %.

Component (F) may also be represented by an alkylphenylpolysiloxane. However, when component (A) is an alkylalkenylpolysiloxane with at least two alkenyl groups in one molecule, component (B) is an alkylhydrogenpolysiloxane having at least two silicon-bonded hydrogen atoms in one molecule, and component (F) is an alkylphenylpolysiloxane that is liquid at room temperature, the content of aforementioned component (F) should be 0 to less than 0.1 wt. %.

The following are specific examples of such component (F): a methylphenylsiloxane.dimethylsiloxane copolymer, methylphenylpolysiloxane or diphenylsiloxane.dimethylsiloxane copolymer capped at both molecular terminals with trimethylsiloxy groups; a methylphenylsiloxane dimethylsiloxane copolymer, or methylphenylpolysiloxane capped at both molecular terminals with dimethylphenylsiloxy groups; phenyl tri(trimethylsiloxy) silane, phenyl tri(dimethylphenylsiloxy) silane, and methyl tri(dimethylphenylsiloxy) silane.

The hydrosilation-curable thermoconductive silicone elastomer composition of the present invention is prepared from aforementioned components (A) through (E), or (A) through (F), but for prolonging the storage time and suppressing increase in viscosity at room temperature, the composition may also incorporate some hydrosilation reaction inhibitors such as alkyne alcohols, enyne compounds, benzotriazole, etc. The following are specific examples of such compounds: 3-methyl-1-butyn-3-ol, 3,5-dimethyl-1-hexen-3-ol, 3-phenyl-1-butyn-3-ol, or similar acetylene-type compounds; 3-methyl-3-penten-1-yne, 3,5-dimethyl-3-hexen-1-yne, or similar enyne compounds; 1,3,5,7-tetramethyl-1,3,5,7-tetravinylcyclotetrasiloxane, 1,3,5,7-tetramethyl-1,3,5,7-tetrahexenylcyclo-tetrasiloxane, benzotriazole, or similar triazols, phosphines, mercaptanes, and hydrazines. These inhibitors should be used in an amount of 0.001 to 5 wt. %.

If necessary and if this is within the limits that are not detrimental to the effects of the present invention, the thermoconductive silicone elastomer and hydrosilation-curable thermoconductive silicone elastomer composition of the present invention may incorporate iron oxide, cerium oxide, or similar agents that impart heat resistant properties; red iron oxide, carbon black, titanium oxide or other pigments; fumed titanium dioxide, zinc carbonate, aluminum hydroxide, or other flame retardants, etc.

The hydrosilation-curable thermoconductive silicone elastomer composition of the present invention is prepared by uniformly mixing together all aforementioned components (A) to (E) or (A) to (F), if necessary, with other arbitrary components, in a mixer equipped with a stirrer. However, components (E) and (F) can be premixed separately and then mixed with components (B) and (C). If component (D) has not been hydrophobized, hydrophobic treatment agents, such as hexamethyldisilazane, silanol-capped dimethylsiloxane oligomer, silanol-capped methylphenylsiloxane oligomer, trimethylsilanol, or the like, can be added to the process at the stage of mixing components (A) and (D).

The thermoconductive silicone elastomer of the present invention can be easily produced by retaining the hydrosilation-curable thermoconductive silicone elastomer composition of the present invention at room temperature or by heating the aforementioned composition. Molding can be carried out by various methods such as compression molding, extrusion molding, liquid injection molding, casting, etc. There are no special restrictions with regard to the shape to which the elastomer can be formed. For example, it can be molded in the form of sheets, tapes, strips, disks, rings, blocks, or irregular-shaped bodies. The tape-like and strip-like forms are advantageous because a thermoconductive silicone elastomer having a large surface area cannot be easily stretched or pulled out.

The thermoconductive silicone elastomer of the present invention should have a hardness of 5 to 70, preferably 7 to 60 measured according to SRIS 0101-1968 by means of a spring-type hardness tester (Asukar C-type tester). Since a hardness of 70 measured by the aforementioned method corresponds to a hardness of 45 measured by Type A durometer in accordance with JIS K 6253, it can be assumed that such silicone elastomer is softer than conventional silicone rubbers. Furthermore, the thermoconductive silicone elastomer of the present invention should have a tensile strength and elongation, according to JIS K 6250, no less than 0.2 MPa and 300%, respectively, and preferably no less than 0.5 MPa and 400 to 1500%, respectively. Elastomer products in the form of sheets, tapes, strips, disks, rings, etc., may have a thickness of 0.5 to 3 mm. The thermoconductive silicone elastomer of the present invention possesses tackiness and adhesive properties, and has a tensile shear adhesive strength of 5 to 30 N/cm$^2$, preferably 7 to 25 N/cm$^2$ according to JIS K 6850 measured with regard to adhesion to a flat specimen of aluminum, glass, or the like.

The thermoconductive silicone elastomer of the present invention adheres to a heat-generating member and a heat-radiating member or heat-dissipating member, and can be peeled or pulled out by stretching without rupture. In the context of the present invention, the term "peelability by pulling" means that the thermoconductive silicone elastomer can be peeled without rupture by stretching from a heat-generating member and a heat-radiating member or heat-dissipating member between which said thermoconductive silicone elastomer is sandwiched during testing under the conditions described in the practical examples. The thermoconductive silicone elastomer of the present invention has thermal conductivity within the range of 0.3 to 3.0 W/m·K.

The thermoconductive silicone elastomer of the present invention can be used as a thermoconductive medium between a semiconductor chip and a heat-radiating plate or heat-dissipating plate, as well as a thermoconductive medium between a heat-radiating plate or heat-dissipating plate and a printed circuit board mounting heat-generating electronic devices such as a memory chip, transistor, IC, hybrid IC, or as a thermoconductive medium between a heat-radiating plate or heat-dissipating plate and a glass panel of a plasma display, a heat-radiating medium or heat-dissipating medium of a DC-DC converter, etc. The aforementioned heat-radiating plate or heat-dissipating plate can be made from aluminum, duralumin, stainless steel, magnesium alloy, or steel. The aforementioned thermoconductive silicone elastomer is produced from the hydrosilation-curable thermoconductive silicone elastomer composition of the present invention. The hydrosilation-curable thermoconductive silicone elastomer composition can be turned into a thermoconductive silicone elastomer by curing when it is sandwiched between a heat-generating member and a heat-radiating member or heat-dissipating member.

PRACTICAL EXAMPLES

The present invention will be further described in more detail with reference to subsequent practical and comparative examples. In these examples, values of all characteristics were measured at 25° C. It is understood that the following practical examples cannot be construed as limiting the scope of application of the present invention. Described below are methods used for evaluation of characteristics of the thermoconductive silicone elastomer such as adhesive strength, peelability, peelability by pulling, hardness, tensile strength, elongation, and thermal conductivity.

[Adhesive Strength and Peelability of Thermoconductive Silicone Elastomer]

1-mm-thick layer of a hydrosilation-curable thermoconductive silicone elastomer composition was placed between a float glass plate and an aluminum plate (A1050P), and the composition was heated at 100° C. for 30 min, whereby the composition was cured. The adhesive strength imparted to the thermoconductive silicone elastomer by curing was measured on a Tensilon Universal Tester (Model RTC 1325A, the product of Orientech Company, Ltd.) in accordance with JIS K 6850.

Peelability was evaluated visually by checking whether the thermoconductive silicone elastomer left some material on the surfaces of the same float glass plate and aluminum plate (A1050P) that were used in the adhesive strength test, or it was completely peeled from the aforementioned surfaces.

[Peelability of Thermoconductive Silicone Elastomer Under the Effect of a Pulling Force]

Figure 2:
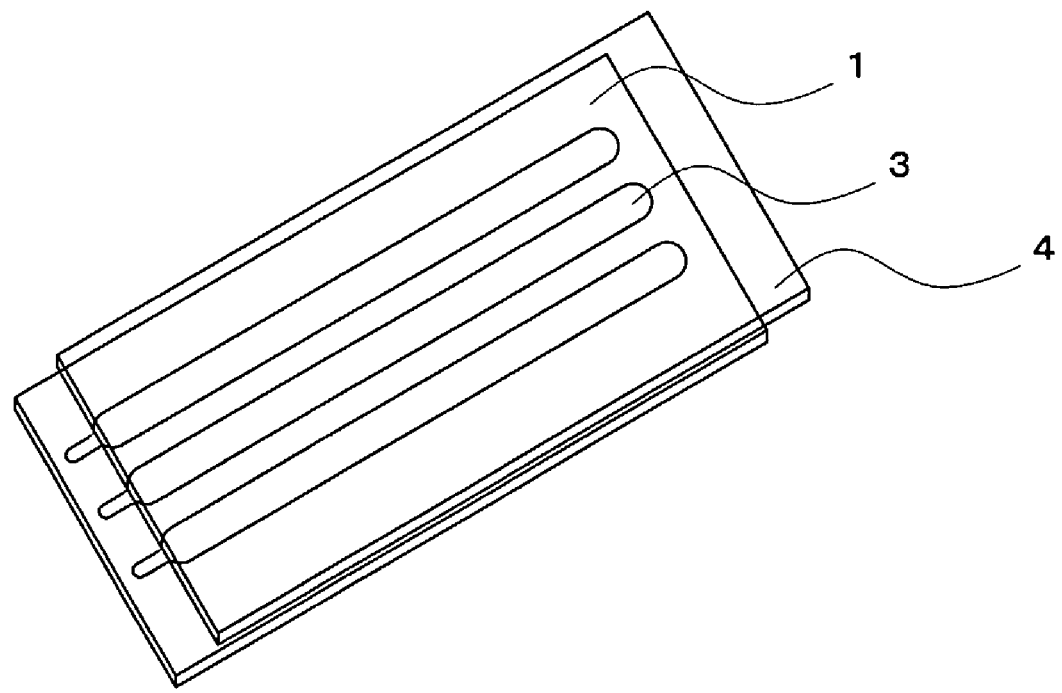
FIG. 2 is a three-dimensional view of a test piece for evaluating peelability by stretching.

The hydrosilation-curable thermoconductive elastomer composition was applied in the form of 180-mm-long strips onto the surface of a 100-mm-wide, 200-mm-long, and 3-mm-thick aluminum plate (A1050P) (see FIG. 1) by using an automatic dispenser. 2-mm-wide, 200-mm-long, and 1-mm-thick aluminum spacers were placed parallel to each other between the aforementioned strips, and then a 100-mm-wide, 200-mm-long, and 3-mm-thick float glass plate was placed onto the composition strips and aluminum spacers so that the composition strips became 10 mm wide and 1 mm thick. However, the float glass plate was positioned so that the front edge of the float glass plate was shifted by 10 mm inward from the front edge of the aluminum plate. In this state, the package was heated for 30 min at 100° C. The aluminum spacers were removed, and the test piece shown in FIG. 2 was obtained. The ends of the thermally conducted silicone elastomer strips that had a width of 10 mm, a length of 180 mm, and a thickness of 1 mm and that were not covered by the float glass plate were stretched in the forward direction at an angle equal to 0° with a pulling rate of 500 mm/min for evaluating whether the thermoconductive silicone elastomer can be peeled and pulled out without rupture or not. It was judged that the elastomer possessed peelability by pulling when it was peeled and pulled out without rupture, and it did not possess this property when it ruptured before pulling out.

[Hardness of Thermoconductive Silicone Elastomer]

The hydrosilation-curable thermoconductive silicone elastomer composition was poured into a flat mold and was subjected to pressure vulcanization for 30 min at 100° C. Two thermoconductive silicone elastomer sheets having a thickness of 6 mm produced by the above method were stacked one on top of the other and were used for measuring hardness of the elastomer under a load of 1 kg by means of a spring-type hardness tester as specified by standard SRIS 0101-1968 relating to a method of testing physical characteristics of expandable rubber (Asukar C-Type Hardness Tester of Kobunshi Keiki Co., Ltd.).

[Tensile Strength and Elongation of Thermoconductive Silicone Elastomer]

The hydrosilation-curable thermoconductive silicone elastomer composition was poured into a flat mold and was subjected to pressure vulcanization for 15 min at 100° C. The obtained 2-mm-thick thermoconductive silicone elastomer sheet was tested with regard to tensile strength and elongation by using dumbbell No. 4 specimens in accordance with JIS K 6251 by using a tensile tester ST102-1 of Ueshima Seisakusho Co., Ltd.

[Thermal Conductivity of Thermoconductive Silicone Elastomer]

The hydrosilation-curable thermoconductive silicone elastomer composition was poured into a flat mold and was subjected to pressure vulcanization for 30 min at 100° C. The obtained 15-mm-thick thermoconductive silicone elastomer sheet was tested with regard to thermal conductivity by using a quick thermal conductivity tester of QTM-500 Model (the product of Kyoto Electronics Manufacturing Co., Ltd.) operating on a principle of a non-steady hot-wire method.

Practical Example 1

A mixer equipped with a stirrer was loaded with the following components: 30.00 wt. % of a dimethylpolysiloxane having a viscosity of 40,000 mPa·s and capped at both molecular terminals with dimethylvinylsiloxy groups (the amount of vinyl groups was 0.09 wt. %); 0.92 wt. % of a dimethylsiloxane.methylhydrogensiloxane copolymer having a viscosity of 25 mPa·s and capped at both molecular terminals with trimethylsiloxy groups (the main molecular chain was composed on average of 27 dimethylsiloxane units and on average three methylhydrogensiloxane units; the content of silicon-bonded hydrogen atom groups was 0.13 wt. %); 0.15 wt. % of a solution of a platinum-1,3-divinyl-1,1,3,3-tetramethyldisiloxane complex (the content of metallic platinum was 0.5 wt. %); 0.03 wt. % of 2-phenyl-3-butyn-2-ol used as an addition-reaction inhibitor; 1.4 wt. % of fumed silica surface-treated with hexamethyldisilazane with a specific surface area of 200 m$^2$/g; and 67.5 wt. % of alumina powder with irregular-shaped particles having an average particle size of 11 μm. The components were uniformly mixed, and, as a result, a hydrosilation-curable thermoconductive silicone elastomer composition was obtained. This composition was cured and used for measuring adhesive strength, peelability, peelability by pulling, hardness, tensile strength, elongation, and thermal conductivity. The results of the measurements are shown in Table 1.

Practical Example 2

A mixer equipped with a stirrer was loaded with the following components: 42.17 wt. % of a dimethylpolysiloxane having a viscosity of 40,000 mPa·s and capped at both molecular terminals with dimethylvinylsiloxy groups (the amount of vinyl groups was 0.09 wt. %); 1.25 wt. % of a dimethylsiloxane.methylhydrogensiloxane copolymer having a viscosity of 25 mPa·s and capped at both molecular terminals with trimethylsiloxy groups (the main molecular chain was composed on average of 27 dimethylsiloxane units and on average three methylhydrogensiloxane units; the content of silicon-bonded hydrogen atom groups was 0.13 wt. %); 0.15 wt. % of a solution of a platinum-1,3-divinyl-1,1,3,3-tetramethyldisiloxane complex (the content of metallic platinum was 0.5 wt. %); 0.03 wt. % of 2-phenyl-3-butyn-2-ol used as an addition-reaction inhibitor; 1.4 wt. % of fumed silica surface-treated with hexamethyldisilazane with a specific surface area of 200 m$^2$/g; and 55.0 wt. % of a crystalline silica powder with irregular-shaped particles having an average particle size of 5 μm. The components were uniformly mixed, and, as a result, a hydrosilation-curable thermoconductive silicone elastomer composition was obtained. This composition was cured and used for measuring adhesive strength, peelability, peelability by pulling, hardness, tensile strength, elongation, and thermal conductivity. The results of the measurements are shown in Table 1.

Practical Example 3

A mixer equipped with a stirrer was loaded with the following components: 42.48 wt. % of a dimethylpolysiloxane having a viscosity of 40,000 mPa·s and capped at both molecular terminals with dimethylvinylsiloxy groups (the amount of vinyl groups was 0.09 wt. %); 0.94 wt. % of a dimethylsiloxane.methylhydrogensiloxane copolymer having a viscosity of 25 mPa·s and capped at both molecular terminals with trimethylsiloxy groups (the main molecular chain was composed on average of 27 dimethylsiloxane units and on average three methylhydrogensiloxane units; the content of silicon-bonded hydrogen atom groups was 0.13 wt. %); 0.15 wt. % of a solution of a platinum-1,3-divinyl-1,1,3,3-tetramethyldisiloxane complex (the content of metallic platinum was 0.5 wt. %); 0.03 wt. % of 2-phenyl-3-butyn-2-ol used as an addition-reaction inhibitor; 1.4 wt. % of fumed silica surface-treated with hexamethyldisilazane with a specific surface area of 200 m$^2$/g; and 55.0 wt. % of a crystalline silica powder with irregular-shaped particles having an average particle size of 5 μm. The components were uniformly mixed, and, as a result, a hydrosilation-curable thermoconductive silicone elastomer composition was obtained. This composition was cured and used for measuring adhesive strength, peelability, peelability by pulling, hardness, tensile strength, elongation, and thermal conductivity. The results of the measurements are shown in Table 1.

Practical Example 4

A mixer equipped with a stirrer was loaded with the following components: 27.29 wt. % of a dimethylpolysiloxane having a viscosity of 40,000 mPa·s and capped at both molecular terminals with dimethylvinylsiloxy groups (the amount of vinyl groups was 0.09 wt. %); 0.63 wt. % of a dimethylsiloxane.methylhydrogensiloxane copolymer having a viscosity of 25 mPa·s and capped at both molecular terminals with trimethylsiloxy groups (the main molecular chain was composed on average of 27 dimethylsiloxane units and on average three methylhydrogensiloxane units; the content of silicon-bonded hydrogen atom groups was 0.13 wt. %); 0.15 wt. % of a solution of a platinum-1,3-divinyl-1,1,3,3-tetramethyldisiloxane complex (the content of metallic platinum was 0.5 wt. %); 0.03 wt. % of 2-phenyl-3-butyn-2-ol used as an addition-reaction inhibitor; 1.4 wt. % of fumed silica surface-treated with hexamethyldisilazane with a specific surface area of 200 $m^2/g$; 67.5 wt. % of an alumina powder with irregular-shaped particles having an average particle size of 11 μm; and 3.0 wt. % of amethyltetradecane-siloxane-methyldodecylsiloxane copolymer having a viscosity of 900 mPa·s and capped at both molecular terminals with trimethylsiloxy groups (the content of dodecyl groups was 33.9 wt. %, the content of tetradecane groups was 39.5 wt. %; of the total number of methyl groups, dodecyl groups, and tetradecane groups, the dodecyl groups constituted 25%; of the total number of methyl groups, dodecyl groups, and tetradecane groups, the tetradecane groups constituted 25%). The components were uniformly mixed, and, as a result, a hydrosilation-curable thermoconductive silicone elastomer composition was obtained. This composition was cured and used for measuring adhesive strength, peelability, peelability by pulling, hardness, tensile strength, elongation, and thermal conductivity. The results of the measurements are shown in Table 1.

Practical Example 5

A mixer equipped with a stirrer was loaded with the following components: 27.29 wt. % of a dimethylpolysiloxane having a viscosity of 40,000 mPa·s and capped at both molecular terminals with dimethylvinylsiloxy groups (the amount of vinyl groups was 0.09 wt. %); 0.63 wt. % of a dimethylsiloxane.methylhydrogensiloxane copolymer having a viscosity of 25 mPa·s and capped at both molecular terminals with trimethylsiloxy groups (the main molecular chain was composed on average of 27 dimethylsiloxane units and on average three methylhydrogensiloxane units; the content of silicon-bonded hydrogen atom groups was 0.13 wt. %); 0.15 wt. % of a solution of a platinum-1,3-divinyl-1,1,3,3-tetramethyldisiloxane complex (the content of metallic platinum was 0.5 wt. %); 0.03 wt. % of 2-phenyl-3-butyn-2-ol used as an addition-reaction inhibitor; 1.4 wt. % of fumed silica surface-treated with hexamethyldisilazane with a specific surface area of 200 $m^2/g$; and 67.5 wt. % of an alumina powder with irregular-shaped particles having an average particle size of 11 μm; and 3.0 wt. % of a methyloctylsiloxane.dimethylsiloxane copolymer having a viscosity of 20 mPa·s and capped at both molecular terminals with trimethylsiloxy groups (the content of octyl groups was 28.3 wt. %; of the total number of methyl groups and octyl groups, the octyl groups constituted 15%). The components were uniformly mixed, and, as a result, a hydrosilation-curable thermoconductive silicone elastomer composition was obtained. This composition was cured and used for measuring adhesive strength, peelability, peelability by pulling, hardness, tensile strength, elongation, and thermal conductivity. The results of the measurements are shown in Table 1.

Practical Example 6

A mixer equipped with a stirrer was loaded with the following components: 27.29 wt. % of a dimethylpolysiloxane having a viscosity of 40,000 mPa·s and capped at both molecular terminals with dimethylvinylsiloxy groups (the amount of vinyl groups was 0.09 wt. %); 0.63 wt. % of a dimethylsiloxane.methylhydrogensiloxane copolymer having a viscosity of 25 mPa·s and capped at both molecular terminals with trimethylsiloxy groups (the main molecular chain was composed on average of 27 dimethylsiloxane units and on average three methylhydrogensiloxane units; the content of silicon-bonded hydrogen atom groups was 0.13 wt. %); 0.15 wt. % of a solution of a platinum-1,3-divinyl-1,1,3,3-tetramethyldisiloxane complex (the content of metallic platinum was 0.5 wt. %); 0.03 wt. % of 2-phenyl-3-butyn-2-ol used as an addition-reaction inhibitor; 1.4 wt. % of fumed silica surface-treated with hexamethyldisilazane with a specific surface area of 200 $m^2/g$; 67.5 wt. % of an alumina powder with irregular-shaped particles having an average particle size of 11 μm; and 3.0 wt. % of methyl(3,3,3-trifluoropropyl)polysiloxane having a viscosity of 300 mPa·s and capped at both molecular terminals with trimethylsiloxy groups (content of 3,3,3-trifluoropropylsiloxane groups was 59.1 wt. %; 3,3,3-trifluoropropylsiloxane constituted 50% of the sum of methyl groups and 3,3,3-trifluoropropylsiloxane groups). The components were uniformly mixed, and, as a result, a hydrosilation-curable thermoconductive silicone elastomer composition was obtained. This composition was cured and used for measuring adhesive strength, peelability, peelability by pulling, hardness, tensile strength, elongation, and thermal conductivity. The results of the measurements are shown in Table 1.

Comparative Example 1

A mixer equipped with a stirrer was loaded with the following components: 28.73 wt. % of a dimethylpolysiloxane having a viscosity of 2,000 mPa·s and capped at both molecular terminals with dimethylvinylsiloxy groups (the amount of vinyl groups was 0.23 wt. %); 2.29 wt. % of a dimethylsiloxane.methylhydrogensiloxane copolymer having a viscosity of 25 mPa·s and capped at both molecular terminals with trimethylsiloxy groups (the main molecular chain was composed on average of 27 dimethylsiloxane units and on average three methylhydrogensiloxane units; the content of silicon-bonded hydrogen atom groups was 0.13 wt. %); 0.15 wt. % of a solution of a platinum-1,3-divinyl-1,1,3,3-tetramethyldisiloxane complex (the content of metallic platinum was 0.5 wt. %); 0.03 wt. % of 2-phenyl-3-butyn-2-ol used as an addition-reaction inhibitor; 1.3 wt. % of fumed silica surface-treated with hexamethyldisilazane with a specific surface area of 200 $m^2/g$; and 67.5 wt. % of an alumina powder with irregular-shaped particles having an average particle size of 11 μm. The components were uniformly mixed, and, as a result, a hydrosilation-curable thermoconductive silicone elastomer composition was obtained. This composition was cured and used for measuring adhesive strength, peelability, peelability by pulling, hardness, tensile strength, elongation, and thermal conductivity. The results of the measurements are shown in Table 2.

Comparative Example 2

A mixer equipped with a stirrer was loaded with the following components: 32.24 wt. % of a dimethylpolysiloxane having a viscosity of 40,000 mPa·s and capped at both molecular terminals with dimethylvinylsiloxy groups (the amount of vinyl groups was 0.09 wt. %); 0.08 wt. % of a methylhydrogenpolysiloxane having a viscosity of 20 mPa·s and capped at both molecular terminals with trimethylsiloxy groups (the main molecular chain was composed on average of 23 methylhydrogensiloxane units; and the content of silicon-bonded hydrogen atom groups was 1.55 wt. %); 0.15 wt. % of a solution of a platinum-1,3-divinyl-1,1,3,3-tetramethyldisiloxane complex (the content of metallic platinum was 0.5 wt. %); 0.03 wt. % of 2-phenyl-3-butyn-2-ol used as an addition-reaction inhibitor; and 67.5 wt. % of an alumina powder with irregular-shaped particles having an average particle size of 11 μm. The components were uniformly mixed, and, as a result, a hydrosilation-curable thermoconductive silicone elastomer composition was obtained. This composition was cured and used for measuring adhesive strength, peelability, peelability by pulling, hardness, tensile strength, elongation, and thermal conductivity. The results of the measurements are shown in Table 2.

Comparative Example 3

A mixer equipped with a stirrer was loaded with the following components: 31.89 wt. % of a dimethylpolysiloxane having a viscosity of 2,000 mPa·s and capped at both molecular terminals with dimethylvinylsiloxy groups (the amount of vinyl groups was 0.23 wt. %); 0.43 wt. % of a dimethylsiloxane.methylhydrogensiloxane copolymer having a viscosity of 5 mPa·s and capped at both molecular terminals with trimethylsiloxy groups (the main molecular chain was composed on average of 3 dimethylsiloxane units an 5 methylhydrogensiloxane units; the content of silicon-bonded hydrogen atom groups was 0.76 wt. %); 0.15 wt. % of a solution of a platinum-1,3-divinyl-1,1,3,3-tetramethyldisiloxane complex (the content of metallic platinum was 0.5 wt. %); 0.03 wt. % of 2-phenyl-3-butyn-2-ol used as an addition-reaction inhibitor; and 67.5 wt. % of an alumina powder with irregular-shaped particles having an average particle size of 11 μm; The components were uniformly mixed, and, as a result, a hydrosilation-curable thermoconductive silicone elastomer composition was obtained. This composition was cured and used for measuring adhesive strength, peelability, peelability by pulling, hardness, tensile strength, elongation, and thermal conductivity. The results of the measurements are shown in Table 2.

Comparative Example 4

A mixer equipped with a stirrer was loaded with the following components: 42.94 wt. % of dimethylpolysiloxane having a viscosity of 2,000 mPa·s and capped at both molecular terminals with dimethylvinylsiloxy groups (the amount of vinyl groups was 0.23 wt. %); 0.58 wt. % of a dimethylsiloxane.methylhydrogensiloxane copolymer having a viscosity of 5 mPa·s and capped at both molecular terminals with trimethylsiloxy groups (the main molecular chain was composed on average of 3 dimethylsiloxane units an 5 methylhydrogensiloxane units; the content of silicon-bonded hydrogen atom groups was 0.76 wt. %); 0.15 wt. % of a solution of a platinum-1,3-divinyl-1,1,3,3-tetramethyldisiloxane complex (the content of metallic platinum was 0.5 wt. %); 0.03 wt. % of 2-phenyl-3-butyn-2-ol used as an addition-reaction inhibitor; 1.3 wt. % of fumed silica surface-treated with hexamethyldisilazane with a specific surface area of 200 $m^2$/g; and 55.0 wt. % of a crystalline silica powder having irregular shape of particles and an average particle size of 5 μm. The components were uniformly mixed, and, as a result, a hydrosilation-curable thermoconductive silicone elastomer composition was obtained. This composition was cured and used for measuring adhesive strength, peelability, peelability by pulling, hardness, tensile strength, elongation, and thermal conductivity. The results of the measurements are shown in Table 2.

Comparative Example 5

A mixer equipped with a stirrer was loaded with the following components: 28.40 wt. % of a dimethylsiloxane.methylvinylsiloxane copolymer having a viscosity of 40,000 mPa·s and capped at both molecular terminals with dimethylvinylsiloxy groups (the content of vinyl groups was 0.13 wt. %); 18.91 wt. % of dimethylpolysiloxane having a viscosity of 10,000 mPa·s and capped at both molecular terminals with dimethylvinylsiloxy groups (the content of vinyl groups was 0.13 wt. %); 1.94 wt. % of a methylhydrogenpolysiloxane having a viscosity of 20 mPa·s and capped at both molecular terminals with trimethylsiloxy groups (the main molecular chain was composed on average of 23 methylhydrogensiloxane units; the content of silicon-bonded hydrogen atom groups was 1.55 wt. %); 0.15 wt. % of a solution of a platinum-1,3-divinyl-1,1,3,3-tetramethyldisiloxane complex (the content of metallic platinum was 0.5 wt. %); 0.03 wt. % of 2-phenyl-3-butyn-2-ol used as an addition-reaction inhibitor; 11.80 wt. % of fumed silica surface-treated with hexamethyldisilazane with a specific surface area of 200 $m^2$/g; 35.50 wt. % of a crystalline silica powder having irregular shape of particles and an average particle size of 5 pm; 2.30 wt. % of alumina powder with irregular shape of particles having average dimension of 11 pm; and 0.97 wt. % of a methyltetradecanesiloxane.methyldodecylsiloxane copolymer having a viscosity of 900 mPa·s and capped at both molecular terminals with trimethylsiloxy groups (the content of dodecyl groups was 33.9 wt. %; the content of tetradecane groups was 39.5 wt. %; of the total number of methyl groups, dodecyl groups, and tetradecane groups, the dodecyl groups constituted 25%; and of the total number of methyl groups, dodecyl groups, and tetradecane groups, the tetradecane groups constituted 25%). The components were uniformly mixed, and, as a result, a hydrosilation-curable thermoconductive silicone elastomer composition was obtained. This composition was cured and used for measuring adhesive strength, peelability, peelability by pulling, hardness, tensile strength, elongation, and thermal conductivity. The results of the measurements are shown in Table 2. This comparative example conforms to Practical Example 2 of JP Kokai S56-2349.

Comparative Example 6

A mixer equipped with a stirrer was loaded with the following components: 43.75 wt. % of a dimethylpolysiloxane having a viscosity of 3,000 mPa·s and capped at both molecular terminals with dimethylvinylsiloxy groups (the content of vinyl groups was 0.16 wt. %); 1.96 wt. % of a methylhydrogenpolysiloxane having a viscosity of 20 mPa·s and capped at both molecular terminals with trimethylsiloxy groups (the main molecular chain was composed on average of 23 methylhydrogensiloxane units; the content of silicon-bonded hydrogen atom groups was 1.55 wt. %); 0.15 wt. % of a solution of a platinum-1,3-divinyl-1,1,3,3-tetramethyldisiloxane complex (the content of metallic platinum was 0.5 wt. %); 0.03 wt. % of 2-phenyl-3-butyn-2-ol used as an addition-reaction inhibitor; 52.33 wt. % of crystalline silica powder having irregular shape of particles and an average particle size of 5 μm; 1.00 wt. % of titanium oxide powder having an average particle size of 1 μm; and 0.78 wt. % of a methylphenylpolysiloxane having a viscosity of 500 mPa·s and capped at both molecular terminals with trimethylsiloxy groups (the content of phenyl groups was 55.7 wt. %; the total amount of methyl groups and phenyl groups was 50 wt. %). The components were uniformly mixed, and, as a result, a hydrosilation-curable thermoconductive silicone elastomer composition was obtained. This composition was cured and used for measuring adhesive strength, peelability, peelability by pulling, hardness, tensile strength, elongation, and thermal conductivity. The results of the measurements are shown in Table 2. This comparative example conforms to Practical Example 3 of JP Kokai S56-2349.

Comparative Example 7

A mixer equipped with a stirrer was loaded with the following components: 43.75 wt. % of a dimethylpolysiloxane having a viscosity of 3,000 mPa·s and capped at both molecular terminals with dimethylvinylsiloxy groups (the content of vinyl groups was 0.16 wt. %); 1.96 wt. % of a methylhydrogenpolysiloxane having a viscosity of 20 mPa·s and capped at both molecular terminals with trimethylsiloxy groups (the main molecular chain was composed on average of 23 methylhydrogensiloxane units; the content of silicon-bonded hydrogen atom groups was 1.55 wt. %); 0.15 wt. % of a solution of a platinum-1,3-divinyl-1,1,3,3-tetramethyldisiloxane complex (the content of metallic platinum was 0.5 wt. %); 0.03 wt. % of 2-phenyl-3-butyn-2-ol used as an addition-reaction inhibitor; 52.33 wt. % of crystalline silica powder having irregular shape of particles and an average particle size of 5 μm; 1.00 wt. % of titanium oxide powder having an average particle size of 1 μm; and 0.97 wt. % of a methyloctylsiloxane.dimethylsiloxane copolymer having a viscosity of 20 mPa·s and capped at both molecular terminals with trimethylsiloxy groups (the content of octyl groups was 28.3 wt. %; of the total amount of methyl groups and octyl groups, the octyl groups constituted 15%). The components were uniformly mixed, and, as a result, a hydrosilation-curable thermoconductive silicone elastomer composition was obtained. This composition was cured and used for measuring adhesive strength, peelability, peelability by pulling, hardness, tensile strength, elongation, and thermal conductivity. The results of the measurements are shown in Table 2. This comparative example conforms to Practical Example 3 of JP Kokai S56-2349.

TABLE 1

| Properties | | | Practical Example No. | | | | | |
|---|---|---|---|---|---|---|---|---|
| | | | 1 | 2 | 3 | 4 | 5 | 6 |
| Adhesive | Glass | N/cm$^2$ | 35 | 23 | 13 | 8 | 9 | 12 |
| strength | Aluminum | N/cm$^2$ | 53 | 32 | 33 | 12 | 11 | 14 |
| Peelability | Glass | N/cm$^2$ | | | Interfacial | | | |
| | Aluminum | N/cm$^2$ | | | separation | | | |
| Peelability by pulling | | — | yes | yes | yes | yes | yes | yes |
| Hardness | | — | 35 | 28 | 53 | 30 | 25 | 25 |
| Tensile strength | | MPa | 0.9 | 0.7 | 1.7 | 1.2 | 0.7 | 0.8 |
| Elongation | | % | 850 | 450 | 470 | 540 | 1150 | 1000 |
| Thermal conductivity | | W/m·K | 0.7 | 0.7 | 0.5 | 0.5 | 0.7 | 0.7 |

TABLE 2

| Properties | | | Comparative Examples | | | | | | |
|---|---|---|---|---|---|---|---|---|---|
| | | | 1 | 2 | 3 | 4 | 5 | 6 | 7 |
| Adhesive | Glass | N/cm$^2$ | 39 | 29 | Separated | 26 | Separated | 40 | 40 |
| strength | Aluminum | N/cm$^2$ | 75 | 26 | Separated | 43 | Separated | 98 | 155 |
| Peelability | Glass | N/cm$^2$ | Interfacial separation | Separation with breakage | | Interfacial separation | | Separation with breakage | |
| | Aluminum | N/cm$^2$ | | | | | | | Interfacial separation |
| Peelability by pulling | | — | No | No | No | No | No | No | No |
| Hardness | | — | 52 | 60 | 72 | 63 | 74 | 64 | 62 |
| Tensile strength | | MPa | 0.7 | 0.8 | 1.8 | 0.8 | 4.8 | 3.3 | 3.1 |
| Elongation | | % | 290 | 290 | 200 | 260 | 111 | 176 | 190 |
| Thermal conductivity | | W/m·K | 0.7 | 0.7 | 0.5 | 0.7 | 0.2 | 0.4 | 0.4 |

INDUSTRIAL APPLICABILITY

The thermoconductive silicone elastomer of the present invention can be used as a thermoconductive medium between a semiconductor chip and a heat-radiating plate or heat-dissipating plate, as well as a thermoconductive medium between a heat-radiating plate or heat-dissipating plate and a printed circuit board mounting heat-generating electronic devices such as a memory chip, transistor, IC, hybrid IC, or as a thermoconductive medium between a heat-radiating plate or heat-dissipating plate and a glass panel of a plasma display, a heat-radiating plate or heat-dissipating medium of a DC-DC converter, etc. The thermoconductive medium of the present invention can be used for conducting heat from heat-generating devices, etc. to heatsink. The hydrosilation-curable thermoconductive silicone elastomer composition of the present invention can be used for manufacturing the aforementioned thermoconductive silicone elastomer.

The invention claimed is:

1. A thermoconductive silicone elastomer, the total 100 wt. % of which comprises: 90 to 10 wt. % of a silicone elastomer being a cured body of a hydrosilation-curable organopolysiloxane composition comprising (A) an organopolysiloxane having at least two alkenyl groups in one molecule, (B) an organohydrogenpolysiloxane having at least two silicon-bonded hydrogen atoms in one molecule, and (C) a platinum-type catalyst; and the following components dispersed in said silicone elastomer: (D) 0.2 to 5.0 wt. % of a reinforcing fine powder silica; (E) 10 to 90 wt. % of a thermoconductive inorganic powder; and (F) greater than 0 to 10 wt. % of a non-reactive organopolysiloxane that is liquid at room temperature; wherein the cured thermoconductive silicone elastomer has a hardness of 5 to 70 measured by a spring-type hardness tester according to SRIS 0101-1968, a tensile strength above 0.2 MPa according to JIS K 6251, an elongation exceeding 300%, said thermoconductive silicone elastomer demonstrates adherence to a heat-generating member and a heat-radiating member or heat-dissipating member, and said thermoconductive silicone elastomer can be peeled by stretching from a heat-generating member and a heat-radiating member or heat-dissipating member between which said thermoconductive silicone elastomer is sandwiched.

2. The thermoconductive silicone elastomer of claim 1, wherein said component (A) is a methylvinylpolysiloxane of the following formula:

$$R^1_3SiO(R_2SiO)_m SiR^2_3$$

where R, $R^1$ and $R^2$ are methyl or vinyl groups; at least two vinyl groups exist in one molecule; and when all R's in one molecule are methyl groups, at least one of $R^1$ and at least one of $R^2$ are vinyl groups; when one R in one molecule is a methyl group, at least one of $R^1$ and $R^2$ is a vinyl group; 0.1 to 2% of the total content of both methyl groups and vinyl groups are vinyl groups; and "m" is a number between 50 and 1000; said alkylhydrogenpolysiloxane is a methylhydrogenpolysiloxane; said component (D) is a fumed silica; said component (E) is an alumina powder or a crystalline silica powder; and said non-reactive organopolysiloxane (F) is a methylalkylpolysiloxane or a methyl(perfluoroalkyl)polysiloxane.

3. A thermoconductive hydrosilation-curable silicone elastomer composition, the total 100 wt. % of which comprises: 90 to 10 wt. % of a hydrosilation-curable organopolysiloxane composition comprising (A) an organopolysiloxane having at least two alkenyl groups in one molecule, (B) an organohydrogenpolysiloxane having at least two silicon-bonded hydrogen atoms in one molecule, and (C) a platinum-type catalyst; (D) 0.2 to 5.0 wt. % of a reinforcing fine powder silica; (E) 10 to 90 wt. % of a thermoconductive inorganic powder; and (F) greater than 0 to 10 wt. % of a non-reactive organopolysiloxane that is liquid at room temperature; wherein a thermoconductive silicone elastomer prepared by curing said composition has a hardness of 5 to 70 measured by a spring-type hardness tester according to SRIS 0101-1968, a tensile strength above 0.2 MPa according to JIS K 6251, an elongation exceeding 300%, said thermoconductive silicone elastomer demonstrates adherence to a heat-generating member and a heat-radiating member or heat-dissipating member, and can be peeled by stretching from a heat-generating member and a heat-radiating member or heat-dissipating member between which said thermoconductive silicone elastomer is sandwiched.

4. The thermoconductive silicone elastomer composition of claim 3, wherein said component (A) is a methylvinylpolysiloxane of the following formula:

$$R^1_3SiO(R_2SiO)_m SiR^2_3$$

where R, $R^1$ and $R^2$ are methyl or vinyl groups; at least two vinyl groups exist in one molecule; and when all R's in one molecule are methyl groups, at least one of $R^1$ and at least one of $R^2$ are vinyl groups; when one R in one molecule is a methyl group, at least one of $R^1$ and $R^2$ is a vinyl group; 0.1 to 2% of the total content of both methyl groups and vinyl groups are vinyl groups; and "m" is a number between 50 and 1000; said alkylhydrogenpolysiloxane is a methylhydrogenpolysiloxane; said component (D) is a fumed silica; said component (E) is an alumina powder or a crystalline silica powder; and said non-reactive organopolysiloxane (F) is a methylalkylpolysiloxane or a methyl(perfluoroalkyl)polysiloxane.

5. A thermoconductive medium comprising the thermoconductive silicone elastomer according to claim 1.

6. A thermoconductive medium comprising the thermoconductive silicone elastomer according to claim 2.

7. The thermoconductive silicone elastomer of claim 1, wherein said component (A) is a dimethylpolysiloxane capped at both molecular terminals with dimethylvinylsiloxy groups, a dimethylsiloxane/methylvinylsiloxane copolymer capped at both molecular terminals with trimethylsiloxy groups, a dimethylsiloxane/methylvinylsiloxane copolymer capped at both molecular terminals with dimethylvinylsiloxy groups, or a dimethylsiloxane/methylvinylsiloxane copolymer capped at both molecular terminals with dimethylethoxysiloxy groups.

8. The thermoconductive silicone elastomer of claim 1, wherein said component (A) is a dimethylpolysiloxane capped at both molecular terminals with dimethylvinylsiloxy groups, the vinyl groups of one molecule constituting 0.1 to 2% of the sum of methyl and vinyl groups; a dimethylsiloxane/methylvinylsiloxane copolymer capped at one molecular terminal with a dimethylvinylsiloxy group and at the other terminal with a trimethylsiloxy group, the vinyl groups of one molecule constituting 0.1 to 2% of the sum of methyl and vinyl groups; or a dimethylsiloxane/methylvinylsiloxane copolymer capped at both molecular terminals with dimethylvinylsiloxy groups, the vinyl groups of one molecule constituting 0.1 to 2% of the sum of methyl and vinyl groups.

9. The thermoconductive silicone elastomer composition of claim 4, wherein said component (A) is a dimethylpolysiloxane capped at both molecular terminals with dimethylvinylsiloxy groups, a dimethylsiloxane/methylvinylsiloxane copolymer capped at both molecular terminals with trimethylsiloxy groups, a dimethylsiloxane/methylvinylsiloxane copolymer capped at both molecular terminals with dimethylvinylsiloxy groups, or a dimethylsiloxane/methylvinylsiloxane copolymer capped at both molecular terminals with dimethylethoxysiloxy groups.

10. The thermoconductive silicone elastomer composition of claim 4, wherein said component (A) is a dimethylpolysiloxane capped at both molecular terminals with dimethylvinylsiloxy groups, the vinyl groups of one molecule constituting 0.1 to 2% of the sum of methyl and vinyl groups; a dimethylsiloxane/methylvinylsiloxane copolymer capped at one molecular terminal with a dimethylvinylsiloxy group and at the other terminal with a trimethylsiloxy group, the vinyl groups of one molecule constituting 0.1 to 2% of the sum of methyl and vinyl groups; or a dimethylsiloxane/methylvinylsiloxane copolymer capped at both molecular terminals with dimethylvinylsiloxy groups, the vinyl groups of one molecule should constitute 0.1 to 2% of the sum of methyl and vinyl groups.

11. The thermoconductive silicone elastomer of claim 1, wherein said component (F) is present in the hydrosilation-curable organopolysiloxane composition in an amount of from 0.1 to 10 wt. %.

12. The thermoconductive silicone elastomer of claim 1, wherein said component (F) is present in the hydrosilation-curable organopolysiloxane composition in an amount of from 1 to 6 wt. %.

13. The thermoconductive silicone elastomer of claim 1, wherein said component (F) is a methylalkylpolysiloxane or a methyl(perfluoroalkyl)polysiloxane.

14. The thermoconductive silicone elastomer of claim 1, wherein said thermoconductive silicone elastomer has a hardness of 7 to 60 measured by a spring-type hardness tester according to SRIS 0101-1968, a tensile strength above 0.5 MPa according to JIS K 6251, and an elongation from 400 to 1500%.

15. The thermoconductive hydrosilation-curable silicone elastomer composition of claim 3, wherein said component (F) is present in an amount of from 0.1 to 10 wt. %.

16. The thermoconductive hydrosilation-curable silicone elastomer composition of claim 3, wherein said component (F) is present in an amount of from 1 to 6 wt. %.

17. The thermoconductive hydrosilation-curable silicone elastomer composition of claim 3, wherein said component (F) is a methylalkylpolysiloxane or a methyl (perfluoroalkyl) polysiloxane.

18. The thermoconductive hydrosilation-curable silicone elastomer composition of claim 3, wherein said thermoconductive silicone elastomer has a hardness of 5 to 60 measured by a spring-type hardness tester according to SRIS 0101-1968, a tensile strength above 0.5 MPa according to JIS K 6251, and an elongation from 400 to 1500%.

19. An article comprising:
a heat-generating member;
a heat-radiating member or a heat-dissipating member disposed opposite said heat-generating member; and
a thermoconductive medium sandwiched between said heat-generating member and said heat-radiating member or said heat-dissipating member;
wherein said thermoconductive medium comprises a thermoconductive silicone elastomer, the total 100 wt. % of which comprises: 90 to 10 wt. % of a silicone elastomer being a cured body of a hydrosilation-curable organopolysiloxane composition comprising (A) an organopolysiloxane having at least two alkenyl groups in one molecule, (B) an organohydrogenpolysiloxane having at least two silicon-bonded hydrogen atoms in one molecule, and (C) a platinum-type catalyst; and the following components dispersed in said silicone elastomer: (D) 0.2 to 5.0 wt. % of a reinforcing fine powder silica; (E) 10 to 90 wt. % of a thermoconductive inorganic powder; and (F) greater than 0 to 10 wt. % of a non-reactive organopolysiloxane that is liquid at room temperature;
wherein said thermoconductive medium has a hardness of 5 to 70 measured by a spring-type hardness tester according to SRIS 0101-1968, a tensile strength above 0.2 MPa according to JIS K 6251, an elongation exceeding 300%;
wherein said thermoconductive medium demonstrates adherence to said heat-generating member and said heat-radiating member or heat-dissipating member; and
wherein said thermoconductive medium can be peeled by stretching from said heat-generating member and said heat-radiating member or heat-dissipating member between which said thermoconductive medium is sandwiched.

20. The article of claim 19, wherein said component (A) is a methylvinylpolysiloxane of the following formula:

where R, $R^1$ and $R^2$ are methyl or vinyl groups; at least two vinyl groups exist in one molecule; and when all R's in one molecule are methyl groups, at least one of $R^1$ and at least one of $R^2$ are vinyl groups; when one R in one molecule is a methyl group, at least one of $R^1$ and $R^2$ is a vinyl group; 0.1 to 2% of the total content of both methyl groups and vinyl groups are vinyl groups; and "m" is a number between 50 and 1000; said component (D) is a fumed silica; said component (E) is an alumina powder or a crystalline silica powder; and said component (F) is a methylalkylpolysiloxane or a methyl (perfluoroalkyl)polysiloxane.

21. An article comprising:
a heat-generating member;
a heat-radiating member or a heat-dissipating member disposed opposite said heat-generating member; and
a thermoconductive medium sandwiched between said heat-generating member and said heat-radiating member or said heat-dissipating member;
wherein said thermoconductive medium is formed from a thermoconductive hydrosilation-curable silicone elastomer composition, the total 100 wt. % of which comprises: 90 to 10 wt. % of a hydrosilation-curable organopolysiloxane composition comprising (A) an organopolysiloxane having at least two alkenyl groups in one molecule, (B) an organohydrogenpolysiloxane having at least two silicon-bonded hydrogen atoms in one molecule, and (C) a platinum-type catalyst; (D) 0.2 to 5.0 wt. % of a reinforcing fine powder silica; (E) 10 to 90 wt. % of a thermoconductive inorganic powder and (F) greater than 0 to 10 wt. % of a non-reactive organopolysiloxane that is liquid at room temperature;
wherein said thermoconductive medium has a hardness of 5 to 70 measured by a spring-type hardness tester according to SRIS 0101-1968, a tensile strength above 0.2 MPa according to JIS K 6251, an elongation exceeding 300%;
wherein said thermoconductive medium demonstrates adherence to said heat-generating member and said heat-radiating member or heat-dissipating member; and
wherein said thermoconductive medium can be peeled by stretching from said heat-generating member and said heat-radiating member or heat-dissipating member between which said thermoconductive medium is sandwiched.

22. The article of claim 21, wherein said component (A) is a methylvinylpolysiloxane of the following formula:

where R, $R^1$ and $R^2$ are methyl or vinyl groups; at least two vinyl groups exist in one molecule; and when all R's in one molecule are methyl groups, at least one of $R^1$ and at least one of $R^2$ are vinyl groups; when one R in one molecule is a methyl group, at least one of $R^1$ and $R^2$ is a vinyl group; 0.1 to 2% of the total content of both methyl groups and vinyl groups are vinyl groups; and "m" is a number between 50 and 1000; said component (D) is a fumed silica; said component (E) is an alumina powder or a crystalline silica powder; and said component (F) is a methylalkylpolysiloxane or a methyl (perfluoroalkyl)polysiloxane.

* * * * *